US008699639B2

(12) United States Patent
Tsuchida

(10) Patent No.: US 8,699,639 B2
(45) Date of Patent: Apr. 15, 2014

(54) RADIO COMMUNICATION DEVICE

(75) Inventor: Masayuki Tsuchida, Sagamihara (JP)

(73) Assignee: JVC KENWOOD Corporation, Kanagawa (JP)

( * ) Notice: Subject to any disclaimer, the term of this patent is extended or adjusted under 35 U.S.C. 154(b) by 252 days.

(21) Appl. No.: 13/317,175

(22) Filed: Oct. 12, 2011

(65) Prior Publication Data

US 2012/0093202 A1    Apr. 19, 2012

(30) Foreign Application Priority Data

Oct. 19, 2010 (JP) ................................ 2010-234280
Nov. 24, 2010 (JP) ................................ 2010-260797

(51) Int. Cl.
*H04L 27/06* (2006.01)

(52) U.S. Cl.
USPC .......................................... 375/344; 375/316

(58) Field of Classification Search
USPC ....................................................... 375/344
See application file for complete search history.

(56) References Cited

U.S. PATENT DOCUMENTS

| | | | |
|---|---|---|---|
| 6,542,727 B1 * | 4/2003 | Kikuchi ..................... | 455/343.1 |
| 2003/0098730 A1 * | 5/2003 | Miyazaki et al. ............. | 327/158 |
| 2004/0042541 A1 * | 3/2004 | Matsumura .................... | 375/219 |
| 2005/0174259 A1 * | 8/2005 | Ely .................................. | 341/5 |
| 2006/0176748 A1 * | 8/2006 | Druilhe et al. ................ | 365/222 |
| 2010/0056097 A1 * | 3/2010 | Liebman ........................ | 455/341 |
| 2010/0121502 A1 * | 5/2010 | Katayama et al. ................ | 701/1 |

FOREIGN PATENT DOCUMENTS

| | | |
|---|---|---|
| JP | 10-322171 | 12/1998 |
| JP | 2000-341046 | 12/2000 |
| JP | 2001-237906 | 8/2001 |

* cited by examiner

*Primary Examiner* — Erin File
(74) *Attorney, Agent, or Firm* — Louis Woo

(57) ABSTRACT

A signal generator outputs a signal whose frequency is uniquely decided by frequency data set therein. A control section can set first data in the frequency generator as frequency data. The control section can transition among an access unimplementing state, an access stand-by state, and an access implementing state. A signal processing section can set second data in the signal generator as frequency data. The signal processing section can transition between an access allowed state and an access inhibited state. The control section transfers, to the signal processing section, a signal indicative of a desire to transition to the access implementing state and a signal indicative of transition of the control section from the access implementing state. The signal processing section transfers, to the control section, a signal indicative of transition of the signal processing section between the access allowed state and the access inhibited state.

3 Claims, 10 Drawing Sheets

RADIO COMMUNICATION DEVICE

BACKGROUND OF THE INVENTION

1. Field of the Invention

This invention relates to a radio communication device using a PLL (phase locked loop) circuit to implement modulation or AFC (automatic frequency control).

2. Description of the Related Art

Some frequency modulators or FSK (frequency shift keying) modulators include a PLL (phase locked loop) using a signal generated by a VCXO (voltage controlled crystal oscillator) as a reference-frequency signal. A modulating signal is inputted into a VCO (voltage controlled oscillator) forming a part of the PLL. The VCO serves to modulate a carrier in accordance with the modulating signal to generate a modulation-resultant signal.

In some cases, for implementing modulation in a wide frequency range from the direct current to several kHz, the VCXO is used to modulate the reference-frequency signal in accordance with the modulating signal. In these cases, there are two modulation paths, that is, a VCO-based modulation path and a VCXO-based modulation path.

For example, Japanese patent application publication number 2000-341046 discloses a frequency modulation (FM) circuit including a VCO-based modulation path and a VCXO-based modulation path.

Many radio communication devices are designed to implement AFC (automatic frequency control) during a reception mode of operation. AFC keeps the related device tuned to a received-signal carrier frequency.

Japanese patent application publication number 2001-237906 discloses a radio receiver including a VCXO for generating a reference-frequency signal that determines a received frequency. The radio receiver implements AFC for enabling the received frequency to follow the frequency of a currently-received base-station signal. Specifically, AFC is implemented by controlling the VCXO in response to a phase error corresponding to a frequency error between the received frequency and the frequency of the base-station signal.

Japanese patent number 3801727 discloses that a frequency converter subjects a received IF signal to frequency conversion responsive to a local oscillator signal to generate a frequency-conversion-resultant signal. A demodulator subjects the frequency-conversion-resultant signal to demodulation to recover transmitted data. The demodulator generates frequency error information and bit error information also. An AFC controller produces corrective information from the frequency error information and the bit error information. The local oscillator signal is generated by a PLL circuit including a fractional frequency division PLL IC. The corrective information controls the fractional frequency division PLL IC to implement AFC for removing the frequency error of the local oscillator signal relative to the received IF signal.

There is a prior-art radio communication device designed so that a frequency for signal transmission or a frequency for signal reception (that is, a selected channel) is set based on a frequency division ratio in a frequency divider forming a part of a PLL, and modulation for signal transmission includes modulation through the use of a VCO forming a part of the PLL and modulation by changing the oscillation frequency of a VCXO which is a reference frequency for the PLL. In addition, AFC during signal reception is implemented by adjusting the oscillation frequency of the VCXO. The prior-art device uses a CPU (central processing unit) for controlling the frequency division ratio in the frequency divider upon change between the signal transmission frequency and the signal reception frequency or change of the signal reception frequency between different channels. Since quick response is required for modulation and AFC, the prior-art device uses a DSP (digital signal processor) to implement modulation and AFC through a DAC (digital-to-analog converter).

Generally, the oscillation frequency of a VCXO tends to vary as the temperature of the VCXO changes or as the VCXO ages. Accordingly, for modulation or AFC using a VCXO, it is not easy to attain sufficient frequency accuracy.

It is conceivable to adjust a frequency division ratio in a frequency divider within a PLL to implement modulation or AFC. In this conceivable case, a TCXO (temperature-compensated crystal oscillator) can be used for generating a reference-frequency signal. Generally, the oscillation frequency of a TCXO which is a reference frequency remains substantially constant as the temperature of the TCXO changes or as the TCXO ages. Preferably, a DSP is used in adjusting the frequency division ratio for modulation or AFC. On the other hand, a CPU is used in controlling the frequency division ratio to change the signal reception frequency or the signal transmission frequency. In this case, when change of the reception signal frequency is requested during the signal reception for which the CPU accesses the frequency divider to set therein frequency setting data to implement AFC, the DSP also accesses the frequency divider to set therein frequency setting data for change of the reception signal frequency. Accordingly, there is a chance that frequency setting data for AFC and frequency setting data for change of the reception signal frequency will collide with each other in the frequency divider.

SUMMARY OF THE INVENTION

It is a first object of this invention to provide a radio communication device in which frequency setting data for a first purpose and frequency setting data for a second purpose are prevented from colliding with each other in a signal generator determining a frequency for signal reception and a frequency for signal transmission.

It is a second object of this invention to provide a radio communication device with good frequency accuracy.

A first aspect of this invention provides a radio communication device comprising a signal generator outputting a signal whose frequency is uniquely decided by frequency data set therein; a control section outputting first data to the signal generator and setting the first data therein as frequency data, the control section being able to transition among an access unimplementing state where the control section does not access the signal generator, an access stand-by state where the control section waits for access to the signal generator, and an access implementing state where the control section accesses the signal generator; and a signal processing section outputting second data to the signal generator and setting the second data therein as frequency data, the signal processing section being able to transition between an access allowed state where the signal processing section is allowed to access the signal generator and an access inhibited state where the signal processing section is inhibited from accessing the signal generator; wherein the control section transfers, to the signal processing section, a signal indicative of a desire to transition to the access implementing state and a signal indicative of transition of the control section from the access implementing state; and wherein the signal processing section transfers, to the control section, a signal indicative of transition of the signal processing section between the access allowed state and the access inhibited state.

A second aspect of this invention is based on the first aspect thereof, and provides a radio communication device wherein the output signal from the signal generator whose frequency is decided by the first data outputted from the control section forms a signal transmitted by the radio communication device or a signal used for demodulation of a received signal, and wherein the output signal from the signal generator whose frequency is decided by the second data outputted from the signal processing section results from AFC in signal reception by the radio communication device or results from modulation for signal transmission by the radio communication device.

A third aspect of this invention is based on the first aspect thereof, and provides a radio communication device wherein the signal generator comprises a PLL circuit including a frequency divider, and each of the first data and the second data decides a frequency division ratio in the frequency divider.

A fourth aspect of this invention is based on the first aspect thereof, and provides a radio communication device wherein the signals transferred between the control section and the signal processing section travel along a data communication line or a control port.

A fifth aspect of this invention is based on the first aspect thereof, and provides a radio communication device further comprising a logical adder implementing OR operation between the first data and the second data and outputting a result of OR operation to the signal generator.

A sixth aspect of this invention is based on the first aspect thereof, and provides a radio communication device wherein each of the first data and the second data comprises at least one of a data signal, an address signal, a control signal, and a clock signal.

A seventh aspect of this invention is based on the first aspect thereof, and provides a radio communication device wherein when the control section transfers, to the signal processing section, the signal indicative of the desire to transition to the access implementing state, the control section commands the signal processing section to reset a frequency division ratio in the signal generator and restricts AFC implemented via the signal processing section.

An eighth aspect of this invention provides a radio communication device comprising a PLL circuit including a frequency divider having a controllable frequency division ratio; a CPU accessible to the frequency divider to control the frequency division ratio; and a DSP accessible to the frequency divider to control the frequency division ratio; wherein in cases where the CPU outputs an access request signal to the DSP when the DSP accesses the frequency divider, the DSP suspends accessing the frequency divider in response to the access request signal and thereafter outputs an access allowance signal to the CPU, and wherein the CPU starts accessing the frequency divider in response to the access allowance signal.

A ninth aspect of this invention is based on the eighth aspect thereof, and provides a radio communication device wherein the CPU outputs an access end signal to the DSP when stopping accessing the frequency divider, and the DSP starts accessing the frequency divider in response to the access end signal.

This invention has the following advantages. Frequency setting data for a first purpose and frequency setting data for a second purpose are prevented from colliding with each other in a signal generator. It is possible to attain good frequency accuracy.

DETAILED DESCRIPTION OF THE INVENTION

Figure 1:
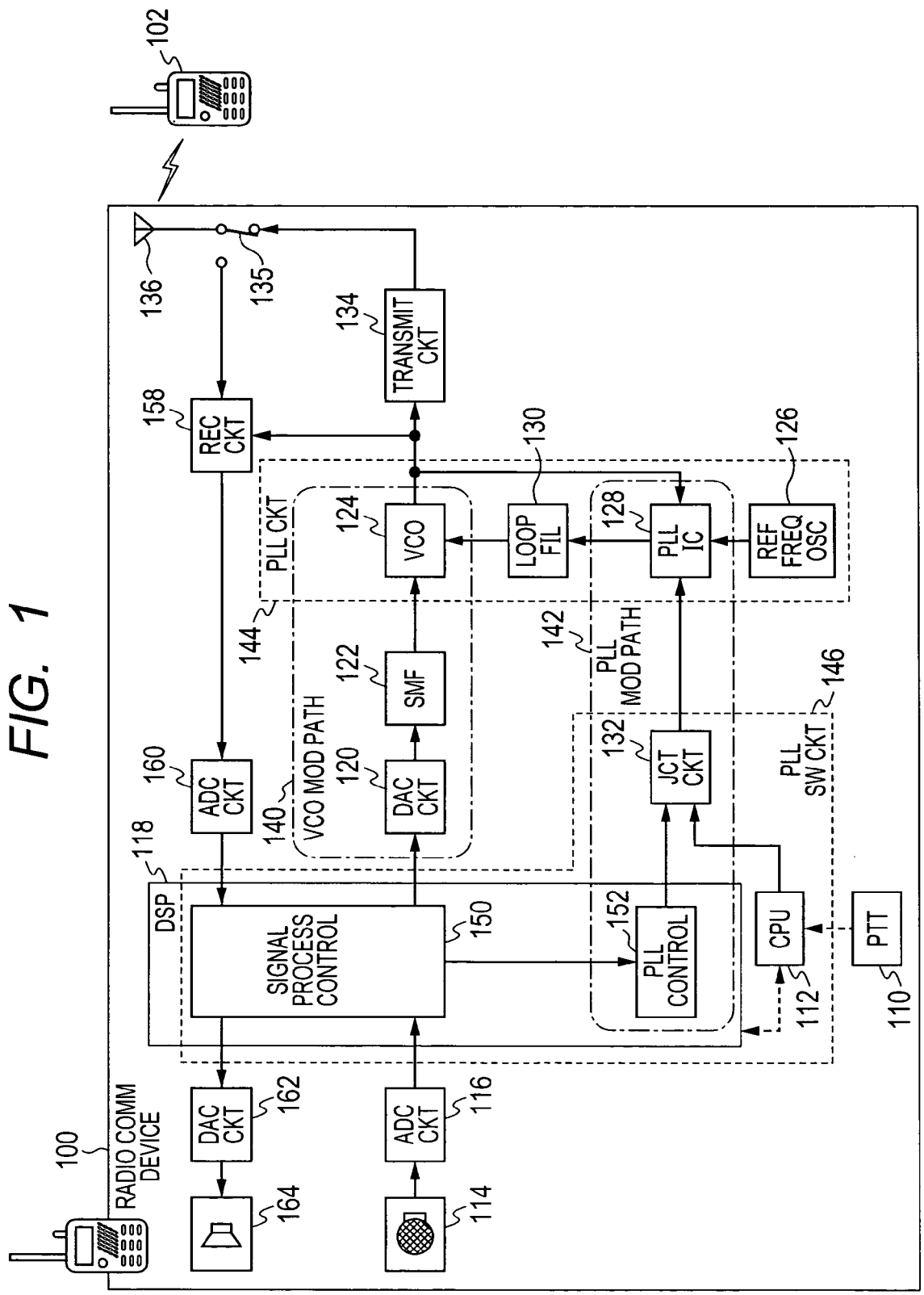
FIG. 1 is a block diagram of a radio communication device according to a preferred embodiment of this invention.

A radio communication device according to a basic embodiment of this invention includes a microphone for converting applied sounds into a corresponding audio signal. The radio communication device converts the audio signal into a radio signal through modulation of a carrier in accordance with the audio signal. The radio communication device transmits the radio signal.

The radio communication device receives a radio signal, and demodulates the received radio signal into an audio signal. A loudspeaker in the radio communication device converts the audio signal into corresponding sounds.

The radio communication device includes a signal generator using a PLL (phase locked loop) circuit. A part of the PLL circuit is formed by a frequency divider. During signal reception, a frequency division ratio in the frequency divider is controlled to implement AFC (automatic frequency control). During signal transmission, the frequency division ratio is controlled to implement FM (frequency modulation) by which an audio signal is converted into an FM signal.

Another part of the PLL circuit is formed by a VCO (voltage controlled oscillator). A signal generated by and outputted from the VCO is modulated in accordance with the audio signal. This modulation is FM or FSK (frequency shift keying).

Thus, the radio communication device has two modulation paths, that is, a VCO-based modulation path formed mainly by the VCO and a PLL-based modulation path for implementing modulation by changing the frequency division ratio in the frequency divider within the PLL circuit. Accordingly, the resultant modulation in the radio communication device is in a wide frequency range from the direct current to several kHz.

In the radio communication device, the PLL-based modulation path is used to implement AFC. Thus, it is unnecessary to vary a reference frequency fed to the PLL circuit. Therefore, a fixed-frequency oscillator such as a TCXO (temperature-compensated crystal oscillator) can be used for generating a signal having the reference frequency. Accordingly, it is possible to attain good frequency accuracy.

The radio communication device includes a CPU (central processing unit) and a DSP (digital signal processor). The CPU accesses the frequency divider in the PLL circuit to set therein first frequency setting data. In addition, the DSP accesses the frequency divider to set therein second frequency setting data (modulating data or AFC data). The radio communication device further includes a PLL switch circuit for preventing the first frequency setting data and the second frequency setting data from colliding with each other in the frequency divider.

The PLL circuit used by the signal generator may be of a full digital type. The signal generator may use a DDS (direct digital synthesizer) instead of the PLL circuit.

A preferred embodiment of this invention will be described hereafter with reference to accompanying drawings. Dimensions, materials, and specific numerical values indicated in the description of the preferred embodiment of this invention are mere examples for an easier understanding of this invention, and do not limit the scope of this invention unless otherwise especially stated. In the present specification and drawings, elements having substantially the same functions and structures are denoted by the same reference characters and duplicate explanations thereof are avoided, and elements having no direct relation with this invention are omitted from the drawings.

FIG. 1 shows a radio communication device 100 according to a preferred embodiment of this invention. In FIG. 1, the solid-line arrows denote the flows of signals to be transmitted such as an audio signal, and the broken-line arrows denote the flows of control signals or commands.

As shown in FIG. 1, the radio communication device 100 includes a PTT (push to talk) switch 110, a CPU 112, a sound collector 114, ADC (analog-to-digital converter) circuits 116 and 160, a DSP 118, DAC (digital-to-analog converter) circuits 120 and 162, an SMF (a smoothing filter) 122, a VCO 124, a reference-frequency oscillator 126, a PLL IC (phase locked loop integrated circuit) 128, a loop filter 130, a junction circuit 132, a transmission circuit 134, a switch 135, an antenna 136, a reception circuit 158, and a loudspeaker circuit 164.

A description will be given below as to signal transmission by the radio communication device 100.

The VCO 124, the reference-frequency oscillator 126, the PLL IC 128, and the loop filter 130 constitute a PLL circuit 144. The CPU 112, the DSP 118, and the junction circuit 132 cooperate to function as a PLL switch circuit 146 for setting a frequency division ratio in the PLL circuit 144. As will be made clear later, the PLL circuit 144 is controlled to implement frequency modulation (FM). It should be noted that frequency modulation may be replaced by FSK or other modulation similar in principle to frequency modulation.

The PTT switch 110 includes an operation key or switch of the push type which can be actuated by a user to accept user's instruction or request. When the user pushes the PTT switch 110, operation of the radio communication device 100 changes from a reception mode to a transmission mode. When the user releases the PTT switch 110, operation of the radio communication device 100 returns from the transmission mode to the reception mode. In the case where the user speaks into the sound collector 114 while continuing to push the PTT switch 110, the sound collector 114 changes the user's speech into a corresponding audio signal and the radio communication device 100 sends the audio signal to another radio communication device 102 on a radio communication basis.

The CPU 112 is provided with a ROM storing a control program (computer program), a RAM used as a work area, and an input/output port. The ROM, the RAM, and the input/output port in the CPU 112 cooperate to manage and control the whole of the radio communication device 100 according to the control program. The management and control of the whole of the radio communication device 100 include man-machine interface control (transmission/reception event control), RF control (transmission/reception channel selection), and DSP control (modulation/demodulation control). The control program is designed to enable the CPU 112 to implement operation steps mentioned hereafter.

The CPU 112 responds to user's instruction or request inputted via the PTT switch 110. The CPU 112 outputs frequency setting data (called first data also) to the PLL switch circuit 146 in response to inputted user's instruction or request. The first data can be sent from the PLL switch circuit 146 to the PLL IC 128 before being loaded into the PLL IC 128. The first data determines the frequency division ratio in the PLL circuit 144 and thereby decides the frequency of the output signal from the PLL circuit 144 when being loaded into the PLL IC 128. The DSP 118 outputs second data to the PLL switch circuit 146. The second data can be sent from the PLL switch circuit 146 to the PLL IC 128 before being loaded into the PLL IC 128. The second data determines the frequency division ratio in the PLL circuit 144 and thereby decides the frequency of the output signal from the PLL circuit 144 when being loaded into the PLL IC 128. The PLL switch circuit 146 acts to prevent the first data and the second data from colliding with each other in the PLL IC 128.

The sound collector 114 includes a microphone, an input amplifier, and an LPF (a low pass filter). The microphone changes received sounds into a corresponding electric analog audio signal. The input amplifier enlarges the audio signal. The LPF removes high-frequency components from the enlarged audio signal to generate a filtered analog audio signal. The LPF feeds the filtered analog audio signal to the ADC circuit 116.

The ADC circuit 116 periodically samples the filtered analog audio signal at a frequency of, for example, 96 kHz, and converts every resultant analog sample into a corresponding digital sample. Thus, the ADC circuit 116 generates a sequence of digital samples called digital audio data. The ADC circuit 116 feeds the digital audio data to the signal processing circuit 118. The analog audio signals and the digital audio data are substantially equal in contents information. The analog audio signals and the digital audio data are synonymous with modulating signals.

The DSP 118 is a semiconductor circuit having a combination of an input/output port, a processing section, a ROM, and a RAM. The DSP 118 operates according to a control program (computer program) stored in the ROM. The control program is designed to enable the DSP 118 to implement operation steps mentioned hereafter. In particular, the control program enables the DSP 118 to function as a signal processing control section 150 and a PLL control section 152.

During signal transmission by the radio communication device 100, the signal processing control section 150 receives the digital audio data from the ADC circuit 116. The signal processing control section 150 superimposes a signal representative of a subtone on the received digital audio data to generate subtone-added digital audio data. The subtone signal continues to be sent together with the audio contents of the digital audio data while the PTT switch 110 remains pushed. The other radio communication device 102 has a squelch circuit and a tone squelch function. While the other radio communication device 102 continues to receive the subtone signal, the tone squelch function continuously opens the squelch circuit in response to the received subtone signal and an analog audio signal recovered from the received digital audio data continues to be fed to, for example, a loudspeaker. Preferably, the subtone signal is a tone signal of a prescribed frequency equal to or lower than 300 Hz which conforms to the CTCSS (continuous tone coded squelch system). The subtone signal may be an extended tone signal conforming to the DCS (digital code squelch) system. The subtone signal may be of an NRZ (non return to zero) code.

The signal processing control circuit 150 feeds the subtone-added digital audio data to the DAC circuit 120 and the PLL control section 152 as modulating data. The DAC circuit 120 forms a portion of a VCO-based modulation path 140. The PLL control section 152 forms a portion of a PLL-based modulation path 142. Thus, the signal processing control circuit 150 splits the modulating data into two directed to the VCO-based modulation path 140 and the PLL-based modulation path 142 respectively.

The PLL control section 152 receives the modulating data from the signal processing control circuit 150. The PLL control section 152 serially transfers the received modulating data to the PLL IC 128 through the junction circuit 132 in accordance with a control format used by the PLL IC 128. A frequency division ratio in the PLL IC 128 is set in response to the transferred modulating data. As will be made clear later, the PLL control section 152 can serially transfer AFC data to the PLL IC 128 through the junction circuit 132. In this case, the frequency division ratio in the PLL IC 128 is set in response to the transferred AFC data. The modulating data and the AFC data transferred to the PLL IC 128 are referred to as second data. Since the frequency division ratio in the PLL IC 128 is set in response to the second data, the frequency of the signal outputted from the PLL circuit 144 varies depending on the second data. As mentioned later, the second data contains not only pure data but also a control signal for the transmission of the pure data.

The DAC circuit 120 receives the modulating data from the signal processing control section 150. The DAC circuit 120 converts the received modulating data into an analog modulating signal (analog audio signal) at an update rate of, for example, 96 kHz. The DAC circuit 120 applies the analog modulating signal to the SMF 122. The SMF 122 forms a portion of the VCO-based modulation path 140. The SMF 122 includes, for example, an LPF (a low pass filter) having a cutoff frequency of 10 kHz. The SMF 122 removes aliasing components caused by the DAC circuit 120 from the applied analog modulating signal, and thereby shapes the waveform of the applied analog modulating signal to generate a waveform-shaped analog modulating signal. The SMF 122 outputs the waveform-shaped analog modulating signal (waveform-shaped analog audio signal) to the VCO 124.

The VCO 124, in conjunction with the PLL IC 128 and the loop filter 130, forms the PLL circuit 144 which decides the frequency of a carrier. The VCO 124 generates a modulation-resultant signal based on the carrier. The VCO 124 outputs the modulation-resultant signal to the transmission circuit 134 and the reception circuit 158 as an output signal from the PLL circuit 144. The output signal from the VCO 124 (the PLL circuit 144) is the carrier in the absence of modulation. The VCO 124 forms a portion of the VCO-based modulation path 140. Regarding a relatively higher part of the wide frequency range from the direct current to several kHz, the VCO 124 modulates the carrier in accordance with the voltage of the analog modulating signal (analog audio signal) outputted from the SMF 122.

The reference-frequency oscillator 126 uses a TCXO containing a crystal oscillator with a temperature compensation circuit. The reference-frequency oscillator 126 outputs a reference-frequency signal to the PLL IC 128. The reference-frequency signal means a signal having a predetermined reference frequency.

Figure 2:
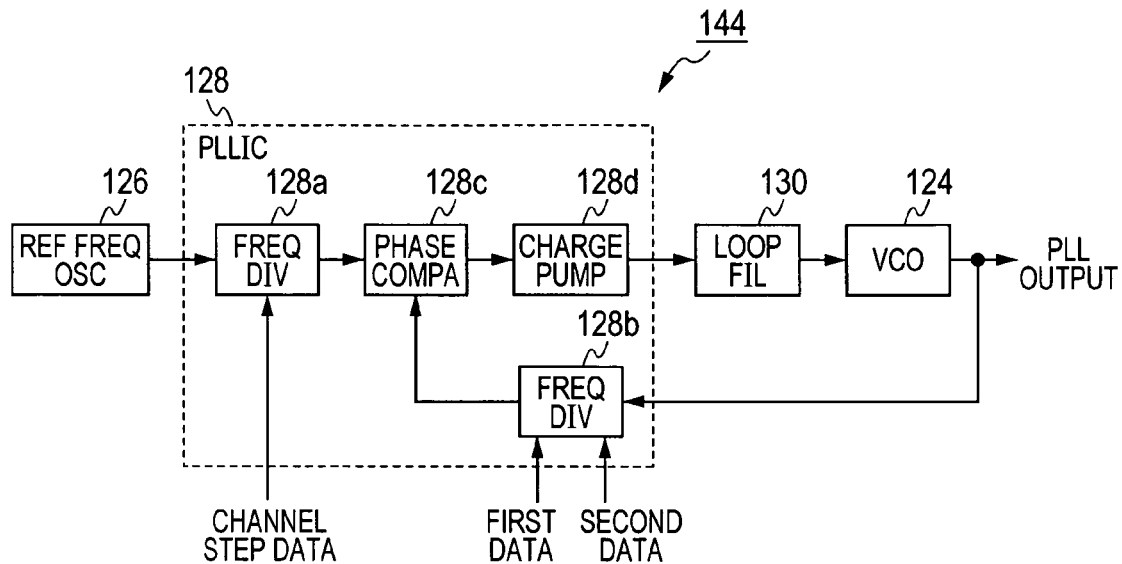
FIG. 2 is a block diagram of a PLL IC and a PLL circuit in FIG. 1.

As shown in FIG. 2, the PLL IC 128 includes frequency dividers 128a and 128b, a phase comparator 128c, and a charge pump 128d. The frequency divider 128a receives the reference-frequency signal from the reference-frequency oscillator 126. The frequency divider 128a divides the frequency of the reference-frequency signal by a value corresponding to a frequency division ratio, and thereby generates a signal having a comparison frequency. The frequency division ratio in the frequency divider 128a is decided by channel step data fed from the CPU 112. Generally, the comparison frequency corresponds to an inter-channel frequency interval (a channel step) in the radio communication device 100. The comparison frequency continues to be unchanged as long as the channel step remains the same.

The frequency divider 128b receives the output signal from the VCO 124, that is, the output signal from the PLL circuit 144. The frequency divider 128b can receive the first data from the CPU 112 through the junction circuit 132. As previously mentioned, the first data is the frequency setting data. The frequency divider 128b can receive the second data from the PLL control section 152 (the DSP 118) through the junction circuit 132. As previously mentioned, the second data is the modulating data or the AFC data. The frequency divider 128b divides the frequency of the output signal from the PLL circuit 144 by a value corresponding to a frequency division ratio decided by the first or second data, and thereby generates a frequency-division-resultant signal.

The phase comparator 128c receives the comparison-frequency signal from the frequency divider 128a. The phase comparator 128c receives the frequency-division-resultant signal from the frequency divider 128b. The phase comparator 128c compares the phase of the comparison-frequency signal and the phase of the frequency-division-resultant signal to generate a signal representative of a phase error between the two signals. The charge pump 128d which follows the phase comparator 128c amplifies the phase-error signal to generate an amplified phase-error signal. The loop filter 130 which follows the charge pump 128d smoothes the amplified phase-error signal to generate a smoothed phase-error signal. The loop filter 130 feeds the smoothed phase-error signal to the VCO 124 as a control voltage therefor so that the frequency of oscillation of the VCO 124 can be locked to a given frequency decided by the first or second data set in the frequency divider 128b.

Specifically, the PLL IC 128 includes a fractional-N PLL IC. The PLL IC 128 serves to uniquely decide the frequency of the output signal from the PLL circuit 144 in accordance with the first or second data set therein. The PLL IC 128 repetitively changes a frequency division ratio N (a frequency resolution of, for example, $2^{18}$) in response to the first data from the control circuit 112 or the second data from the PLL control section 152 at an update rate of, for example, 96 kHz, and thereby shifts the frequency of the output signal from the PLL circuit 144 on a stepwise basis.

Preferably, the PLL IC 128 has separate input data ports for the first data (the frequency setting data) and the second data (the modulating data and the AFC data) respectively. The frequency division ratio in the PLL IC 128 is decided by the first data and the second data. This means that the frequency division ratio in the PLL circuit 144 is decided by the first data and the second data.

The output signal from the PLL circuit 144, the frequency of which is decided by the first data from the CPU 112, is a signal to be transmitted during signal transmission by the radio communication device 100, and is a signal to be used for demodulation at a received frequency during signal reception by the radio communication device 100.

The output signal from the PLL circuit 144, the frequency of which depends on the second data from the DSP 118, is a signal resulting from AFC during signal reception by the radio communication device 100, and is a modulation-resultant signal during signal transmission by the radio communication device 100.

The frequency shift of the output signal from the PLL circuit 144 is used for changing the carrier frequency among the central frequencies of different transmission channels in response to the frequency setting data. Furthermore, regarding a relatively lower part of the wide frequency range from the direct current to several kHz, the frequency shift of the output signal from the PLL circuit 144 is used for modulating the carrier in accordance with the modulating data (the audio data or the second data). Thus, the PLL IC 128 sets the carrier to a frequency of, for example, several hundreds of MHz in response to the frequency setting data (the first data), and modulates the carrier in accordance with the modulating data within a frequency range of several hundreds of Hz.

During the modulation responsive to the second data, since the frequency division ratio N in the PLL IC 128 is varied in accordance with the modulating data, the modulation frequency range can extend from the direct current.

The loop filter 130 smoothes the output signal from the PLL IC 128 (the charge pump 128d) to generate a smoothed signal. The loop filter 130 applies the smoothed signal to the VCO 124 as a control voltage therefor. The PLL circuit 144 has a cutoff frequency fc decided by the frequency response of the loop filter 130. Therefore, the PLL circuit 144 responds to and follows a variation in the modulating data (the audio data) from the PLL control section 152 which is in a frequency range lower than the cutoff frequency fc.

The radio communication device 100 avoids direct modulation by the reference-frequency oscillator 126. The reference frequency decided by the reference-frequency oscillator 126 is fixed. Instead, modulation is performed through the use of a frequency shift caused by the PLL IC 128. Frequency modulation or FSK modulation is implemented by the two systems, that is, the VCO-based modulation path 140 and the PLL-based modulation path 142.

For a frequency range higher than the cutoff frequency fc, the PLL circuit 144 hardly responds to a variation in the modulating data (the audio data) from the PLL control section 152. Specifically, the output voltage from the loop filter 130, which is applied to the VCO 124 as a control voltage therefor, remains substantially constant. Thus, for the frequency range higher than the cutoff frequency fc, the VCO 124 can independently implement modulation responsive to the modulating data from the SMF 122 without being affected by the frequency response of the PLL circuit 144.

For a frequency range lower than the cutoff frequency fc, the PLL circuit 144 sufficiently responds to a variation in the modulating data (the audio data) from the PLL control section 152. Thus, the PLL IC 128 effectively implements modulation, and the PLL-based modulation path 142 contributes to overall modulation. For the frequency range lower than the cutoff frequency fc, the VCO 124 functions as a portion of the PLL circuit 144, and the low pass filtering effect by the loop filter 130 causes modulation by the VCO-based modulation path 140 to be not reflected in a signal resulting from modulation by the PLL-based modulation path 142.

A consideration is made as to an assumed modulation structure designed so that target modulation is implemented by the PLL-based modulation path 142 only. In the assumed modulation structure, for operation in a wide frequency range, it is necessary to increase the cutoff frequency fc of the PLL circuit 144. The increase in the cutoff frequency fc raises the noise level and decreases the C/N ratio (carrier to noise radio) in the VCO 124. The decrease in the C/N ratio may make it difficult to meet the system requirements concerning limitations on unwanted powers leaking from the selected transmission channel to the neighboring transmission channels.

In the radio communication device 100, the VCO-based modulation path 140 and the PLL-based modulation path 142 complement each other and provide a resultant or composite modulation circuit having a substantially flat frequency response over a wide frequency range. Since the reference-frequency oscillator 126 uses a TCXO, it is possible to suppress a frequency change in the reference-frequency oscillator as the ambient temperature changes. Thus, the radio communication device 100 is good in frequency stability.

In the radio communication device 100, the PLL-based modulation path 142 implements modulation in accordance with the digital data. The modulation with the digital data is better than modulation with an analog signal in accuracy, resolution, and stability.

The junction circuit 132 is connected among the CPU 112, the PLL control section 152, and the PLL IC 128. The junction circuit 132 transfers the first data from the CPU 112 to the PLL IC 128. The junction circuit 132 also transfers the second data from the PLL control section 152 to the PLL IC 128. Each of the first data and the second data includes at least one of a data signal, an address signal, a control signal, and a clock signal. The frequency division ratio in the PLL IC 128 is decided in accordance with the first data or the second data transferred thereto. The junction circuit 132 forms a portion of the PLL switch circuit 146.

The transmission circuit 134 amplifies the modulation-resultant signal outputted from the VCO 124 to generate an amplified modulation-resultant signal. The amplified modulation-resultant signal is fed from the transmission circuit 134 to the antenna 136 through the switch 135. In this case, the switch 135 is controlled by a command from the CPU 112 to connect the antenna 136 with the transmission circuit 134. The amplified modulation-resultant signal is radiated from the antenna 136 as a radio wave, and is transmitted to the other radio communication device 102.

A description will be given below as to signal reception by the radio communication device 100. The reception circuit 158, the ADC circuit 160, the DSP 118, the VCO 124, the reference-frequency oscillator 126, the PLL IC 128, and the loop filter 130 cooperate to form an FM demodulation circuit.

The switch 135 is controlled by a command from the CPU 112 to connect the antenna 136 with the reception circuit 158. The antenna 136 catches a radio wave transmitted from the other radio communication device 102. The caught radio wave is fed from the antenna 136 to the reception circuit 158 through the switch 136 as a received signal. The reception circuit 158 subjects the received signal to demodulation responsive to the output signal from the VCO 124 (the PLL circuit 144) to generate an analog demodulation-resultant signal. The reception circuit 158 feeds the analog demodulation-resultant signal to the ADC circuit 160.

The ADC circuit 160 converts the analog demodulation-resultant signal into digital demodulation-resultant data. The ADC circuit 160 feeds the digital demodulation-resultant data to the DSP 118. The DSP 118 extracts digital audio data from the digital modulation-resultant data. The DSP 118 outputs the digital audio data to the DAC circuit 162. The DAC circuit 162 converts the digital audio data into an analog audio signal. The DAC circuit 162 feeds the analog audio signal to the loudspeaker circuit 164. The loudspeaker circuit 164 has a combination of an LPF, an output amplifier, and a loudspeaker. The loudspeaker circuit 164 changes the analog audio signal into corresponding sounds that are emitted from the loudspeaker.

For signal reception by the radio communication device 100, the DSP 118 functions as the signal processing control section 150 and the PLL control section 152. The signal processing control section 150 detects a frequency error and a bit error by referring to the digital modulation-resultant data. The signal processing control section 150 generates AFC data from the detected frequency error and the detected bit error. The generated AFC data is designed to correct the frequency of the output signal from the PLL circuit 144. The PLL control section 152 receives the AFC data from the signal processing control section 150. As previously mentioned, the AFC data is called the second data also.

The PLL control section 152 serially transfers the received AFC data to the PLL IC 128 through the junction circuit 132 in accordance with the control format used by the PLL IC 128. The frequency division ratio in the PLL IC 128 is decided in accordance with the transferred AFC data so that AFC is implemented to remove a frequency error of the output signal from the PLL circuit 144 relative to the received signal currently inputted into the reception circuit 158. Accordingly, AFC is implemented through the PLL-based modulation path 142, and good frequency accuracy of the output signal from the PLL circuit 144 can be attained. The good frequency accuracy enables the radio communication device 100 to correctly recover an audio signal transmitted from the other radio communication device 102.

The CPU 112 can transfer the first data to the PLL IC 128 through the junction circuit 132 to control the frequency division ratio in the PLL IC 128. The DSP 118 (the PLL control section 152) can transfer the second data to the PLL IC 128 through the junction circuit 132 to control the frequency division ratio in the PLL IC 128. Thus, both the CPU 112 and the DSP 118 can access the PLL IC 128 to control the frequency division ratio therein. To prevent the first data and the second data from colliding with each other in the PLL IC 128, the CPU 112 and the DSP 118 are designed so that access to the PLL IC 128 from the CPU 112 and access to the PLL IC 128 from the DSP 118 will be exclusive relative to each other.

Figure 3:
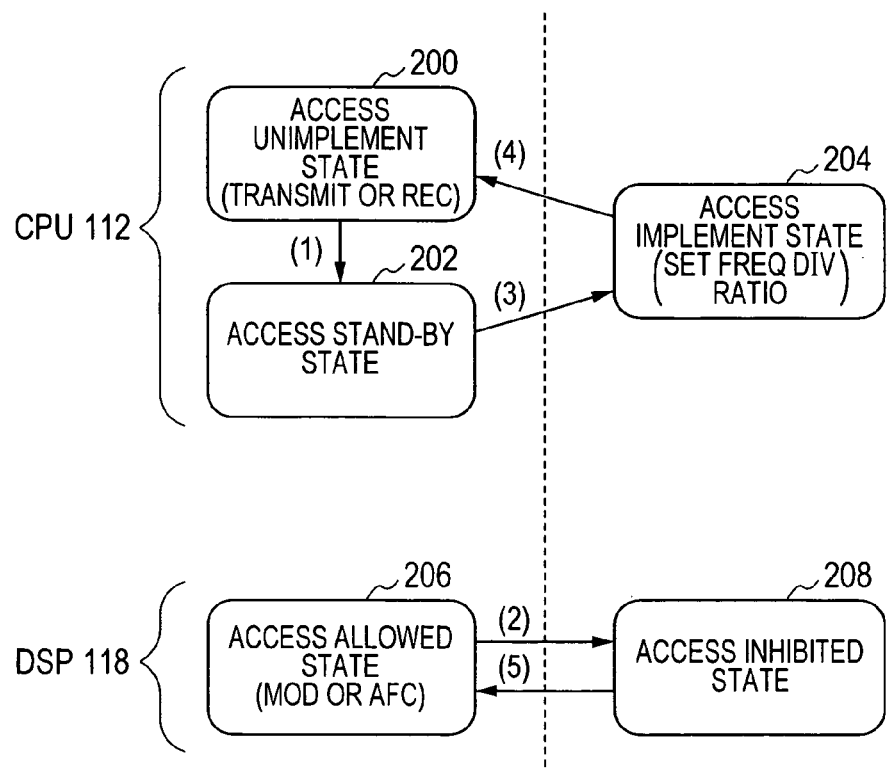
FIG. 3 is a diagram showing the state transitions of a CPU and a DSP in FIG. 1.

With reference to FIG. 3, the CPU 112 transitions among three different states, that is, an access unimplementing (non-implementing) state 200 where the CPU 112 does not access the PLL IC 128, an access stand-by state 202 where the CPU 112 waits for access to the PLL IC 128, and an access implementing state 204 where the CPU 112 accesses the PLL IC 128. Here, "unimplementing" is used as an antonym with respect to "implementing". The DSP 118 transitions between two different states, that is, an access allowed state 206 where the DSP 118 is allowed to access the PLL IC 128 and an access inhibited state 208 where the DSP 118 is inhibited from accessing the PLL IC 128.

While the radio communication device 100 maintains signal transmission or signal reception, the CPU 112 remains in the access unimplementing state 200 so that the CPU 112 does not access the PLL IC 128. During this term, the DSP 118 (the PLL control section 152) remains in the access allowed state 206 under the control by the CPU 112 so that the DSP 118 repetitively transfers the second data (the modulating data or the AFC data) to the PLL IC 128 to update the frequency division ratio therein.

When the user actuates the PTT switch 110 to change signal transmission or signal reception by the radio communication device 100 from the current condition to another condition or to change one of signal transmission and signal reception by the radio communication device 100 to the other, the CPU 112 feeds the DSP 118 with a first signal for requiring the DSP 118 to transition from the access allowed state 206 to the access inhibited state 208. At the same time, the CPU 112 transitions from the access unimplementing state 200 to the access stand-by state 202 as denoted by the arrow (1) in FIG. 3. Upon the reception of the first signal, the DSP 118 starts making preparations for suspension of access to the PLL IC 128. The DSP 118 continues to be in the access allowed state 206 until the preparations for suspension of access are completed.

When the preparations for suspension of access are completed, the DSP 118 transitions from the access allowed state 206 to the access inhibited state 208 as denoted by the arrow (2) in FIG. 3. At the same time, the DSP 118 outputs, to the CPU 112, a second signal indicative of the transition from the access allowed state 206 to the access inhibited state 208. Upon the reception of the second signal, the CPU 112 transitions from the access stand-by state 202 to the access implementing state 204 as denoted by the arrow (3) in FIG. 3. Then, the CPU 112 transfers the first data (the frequency setting data) to the PLL IC 128 to update the frequency division ratio in the PLL IC 128 to set the frequency of the output signal from the PLL circuit 144 for new signal transmission or new signal reception (change-resultant signal transmission or change-resultant signal reception) by the radio communication device 100.

When the updating of the frequency division ratio in response to the first data is completed, the CPU 112 outputs a third signal to the DSP 118 and transitions from the access implementing state 204 to the access unimplementing state 200 as denoted by the arrow (4) in FIG. 3. Upon the reception of the third signal, the DSP 118 transitions from the access inhibited state 208 to the access allowed state 206 as denoted by the arrow (5) in FIG. 3. At the same time, the DSP 118 outputs, to the CPU 112, a fourth signal indicative of the transition from the access inhibited state 208 to the access allowed state 206. When assuming the access allowed state 206, the DSP 118 restarts repetitively transferring the second data (the modulating data or the AFC data) to the PLL IC 128 to update the frequency division ratio therein.

Thus, the DSP 118 is in the access allowed state 206 while the CPU 112 is in the access unimplementing state 200 or the access stand-by state 202. The DSP 118 is in the access inhibited state 208 when the CPU 112 is in the access implementing state 204.

In the case where the DSP 118 remains in the access allowed state 206, the CPU 112 outputs the first signal to the DSP 118 when falling into conditions needing the right to access the PLL IC 128. The first signal requires the DSP 118 to turn over the access right to the CPU 112. Upon the reception of the first signal, the DSP 118 starts making the preparations for suspension of access to the PLL IC 128. When the preparations for suspension of access are completed, the DSP 118 transitions from the access allowed state 206 to the access inhibited state 208 and returns the second signal to the CPU 112. Upon the reception of the second signal, the CPU 112 transitions from the access stand-by state 202 to the access implementing state 204. Thus, the access right is transferred from the DSP 118 to the CPU 112 after the DSP 118 completes the preparations for suspension of access. This design is adopted in view of the following facts.

The setting of the frequency of the output signal from the PLL circuit 144 by the CPU 112 is substantially free from temporal limitations. Modulation or AFC via the DSP 118 needs to be instant. A timing of loopback in AFC is decided (for example, a timing in the duration of a guard portion or a sync word of received data). During modulation or AFC via the DSP 118, the CPU 112 outputs the first signal to the DSP 118 and then awaits the second signal from the DSP 118 which indicates a timing at which modulation or AFC is safely suspended. After the reception of the second signal, the CPU 112 accesses the PLL IC 128 to control the frequency division ratio therein. Thus, only when the access right has been transferred to the CPU 112 from the DSP 118, the CPU 112 accesses the PLL IC 128.

Figure 4:
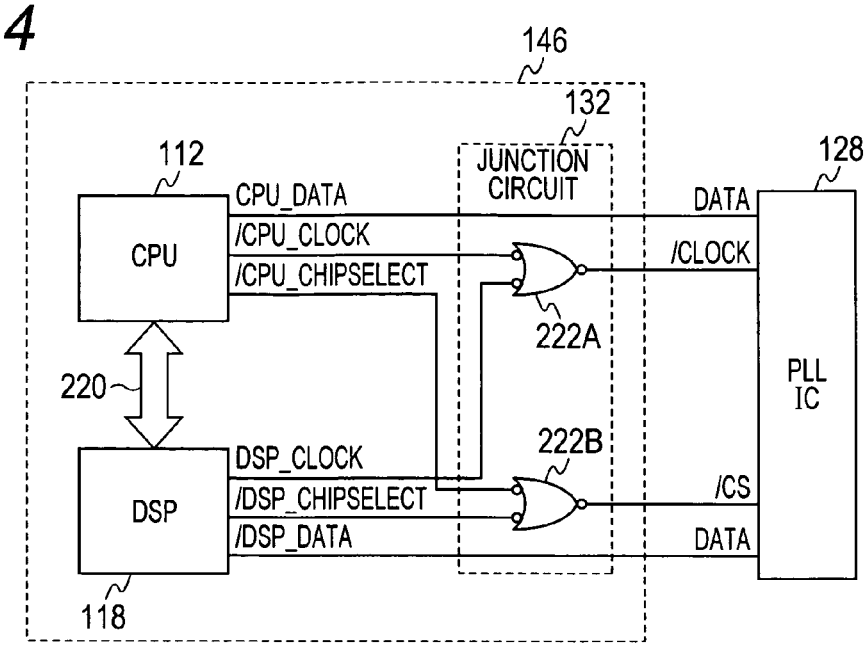
FIG. 4 is a block diagram of a PLL switch circuit in FIG. 1.

With reference to FIG. 4, the PLL switch circuit 146 includes the CPU 112, the DSP 118, and the junction circuit 132. A data communication line 220 designed to conduct 2-bit or more information is provided between the CPU 112 and the DSP 118. The data communication line 220 may consist of an address line and a data line. The data communication line 220 may be of a type for serial transmission of data. The above-mentioned first, second, third, and fourth signals are transferred between the CPU 112 and the DSP 118 via the data communication line 220 so that the state transitions of the CPU 112 and the DSP 118 in FIG. 3 are reliably implemented. In the case where the state transitions of the CPU 112 and the DSP 118 are reliably implemented, the first data from the CPU 112 and the second data from the DSP 118 are prevented from colliding with each other.

The first data outputted from the CPU 112 consists of a serial data signal, a clock signal, and a chip select signal. Similarly, the second data outputted from the DSP 118 consists of a serial data signal, a clock signal, and a chip select signal.

The junction circuit 132 includes logical adders 222A and 222B. The logical adder 222A implements logical addition (OR operation) between the clock signal from the CPU 112 and the clock signal from the DSP 118, and outputs a resultant clock signal to the PLL IC 128. The logical adder 222A implements logical addition (OR operation) between the chip select signal from the CPU 112 and the chip select signal from the DSP 118, and outputs a resultant chip select signal to the PLL IC 128. The serial data signal from the CPU 112 passes through the junction circuit 132 before reaching the PLL IC 128. The serial data signal outputted from the DSP 118 passes through the junction circuit 132 before reaching the PLL IC 128.

Regarding the PLL IC 128, the resolution of the frequency division ratio N is equal to, for example, $2^{18}$. The PLL IC 128 has an input data port assigned to higher bits of the resolution while another input data port assigned to the remaining lower bits of the resolution. Generally, the first data from the CPU 112 corresponds to a great change of the frequency of the output signal from the PLL circuit 144 during channel selection (in the range of, for example, 150 MHz to 300 MHz). Accordingly, the serial data signal in the first data is applied to the higher-bit input data port of the PLL IC 128. Generally, the second data (the modulating data or the AFC data) from the DSP 118 corresponds to a small change of the frequency of the output signal from the PLL circuit 144 (in the range of, for example, 0 Hz to 10 kHz). Accordingly, the serial data signal in the second data is applied to the lower-bit input data port of the PLL IC 128.

Each of the first data and the second data may be one of a serial or parallel data signal, an address signal, a control signal, and a clock signal or a set of two or more of them. In this case, the address signal, the control signal, and the clock signal can travel to the PLL IC 128 through the logical adders 222A and 222B and an additional logical adder.

As understood from the above description, the mediation is performed between the CPU 112 and the DSP 118 regarding the right of access to the PLL IC 128 while each of the CPU 112 and the DSP 118 checks the conditions of the other through the exchange of the first, second, third, and fourth signals. The PLL switch circuit 146 except the CPU 112 and the DSP 118 is formed only by simple circuits, that is, the logical adders 222A and 222B. The PLL switch circuit 146 is exclusive of relays or mechanical switches. The PLL switch circuit 146 prevents the first data outputted by the CPU 112 and the second data outputted by the DSP 118 from colliding with each other. The logical adders 222A and 222B operate without chattering. Changes between the application of the first data to the PLL IC 128 and the application of the second data to the PLL IC 128 can be stably and seamlessly performed. The area occupied by the junction circuit 132 is relatively narrow.

Figure 5:
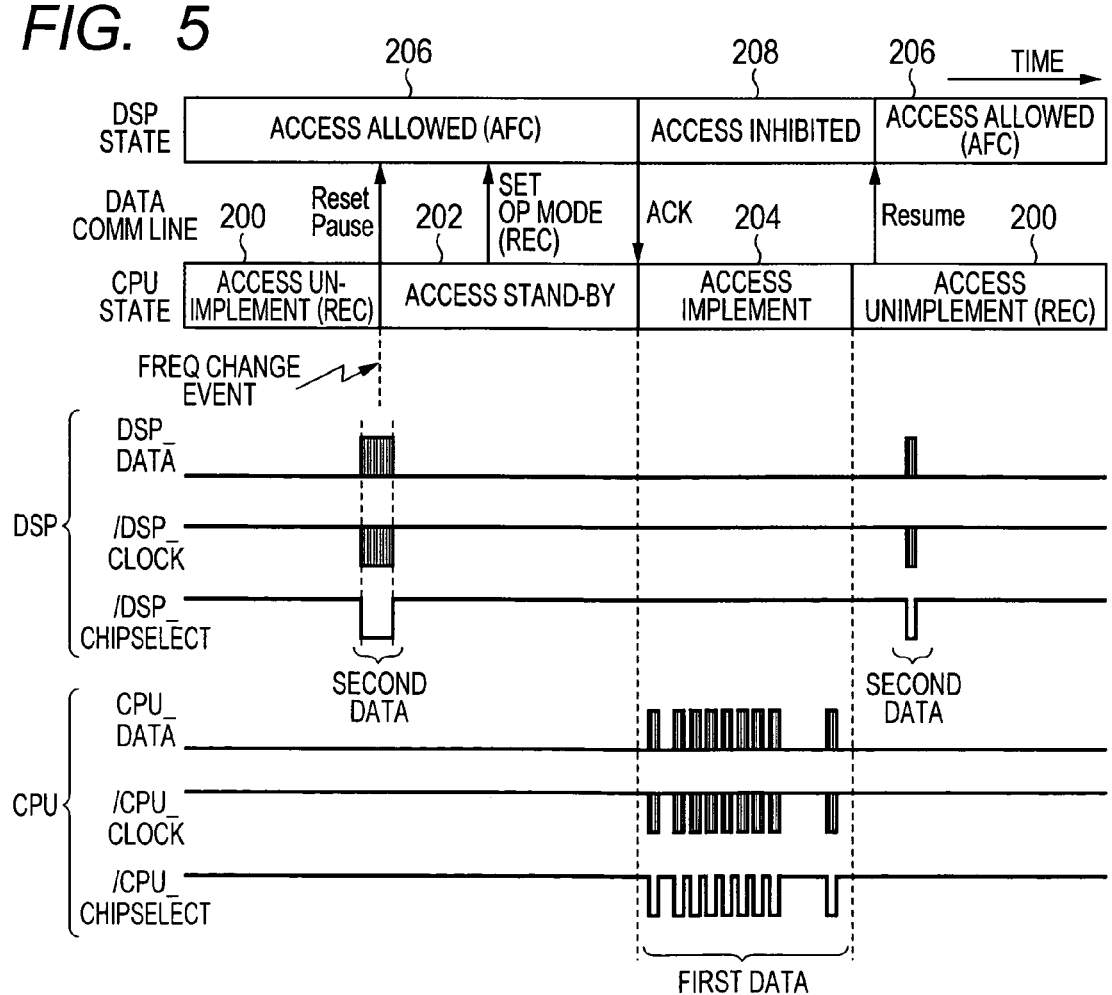
FIG. 5 is a time domain diagram showing a first example of the state transitions of a CPU and a DSP in FIG. 4.

With reference to FIG. 5, in the case where the radio communication device 100 implements signal reception so that the CPU 112 is in the access unimplementing state 200 and the DSP 118 is in the access allowed state 206, when there occurs an event that requests change of the frequency of the output signal from the PLL circuit 144, the CPU 112 outputs the first signal to the DSP 118 via the data communication line 220. At the same time, the CPU 112 transitions from the access unimplementing state 200 to the access stand-by state 202. The first signal includes a command to reset an offset in AFC and a command to pause AFC. Thereafter, the CPU 112 sets an after-change operation mode (reception) in the DSP 118 and awaits the second signal from the DSP 118. When the DSP 118 is accessing the PLL IC 128 at the time of the transfer of the first signal from the CPU 112 to the DSP 118, the CPU 112 transitions from the access unimplementing state 200 to the access stand-by state 202 and does not output the first data to the PLL IC 128. Thus, the first data and the second data are prevented from colliding with each other in the PLL IC 128.

Upon the reception of the first signal, the DSP 118 which is in the access allowed state 206 starts safely pausing AFC. When safely pausing AFC is completed, the DSP 118 outputs the second signal inclusive of an acknowledgment signal (ACK) to the CPU 112 via the data communication line 220. At the same time, the DSP 118 transitions from the access allowed state 206 to the access inhibited state 208. Upon the reception of the second signal, the CPU 112 transitions from the access stand-by state 202 to the access implementing state 204. Then, the CPU 112 sets the first data in the PLL IC 128 to control or update the frequency division ratio therein. When the setting of the first data in the PLL IC 128 is completed, the CPU 112 transitions from the access implementing state 204 to the access unimplementing state 200. Then, the CPU 112 outputs the third signal to the DSP 118 via the data communication line 220. The third signal includes a command to resume the access allowed state 206. Upon the reception of the third signal, the DSP 118 transitions from the access inhibited state 208 to the access allowed state 206 and recommences setting the second data in the PLL IC 128 to restart AFC.

Figure 6:
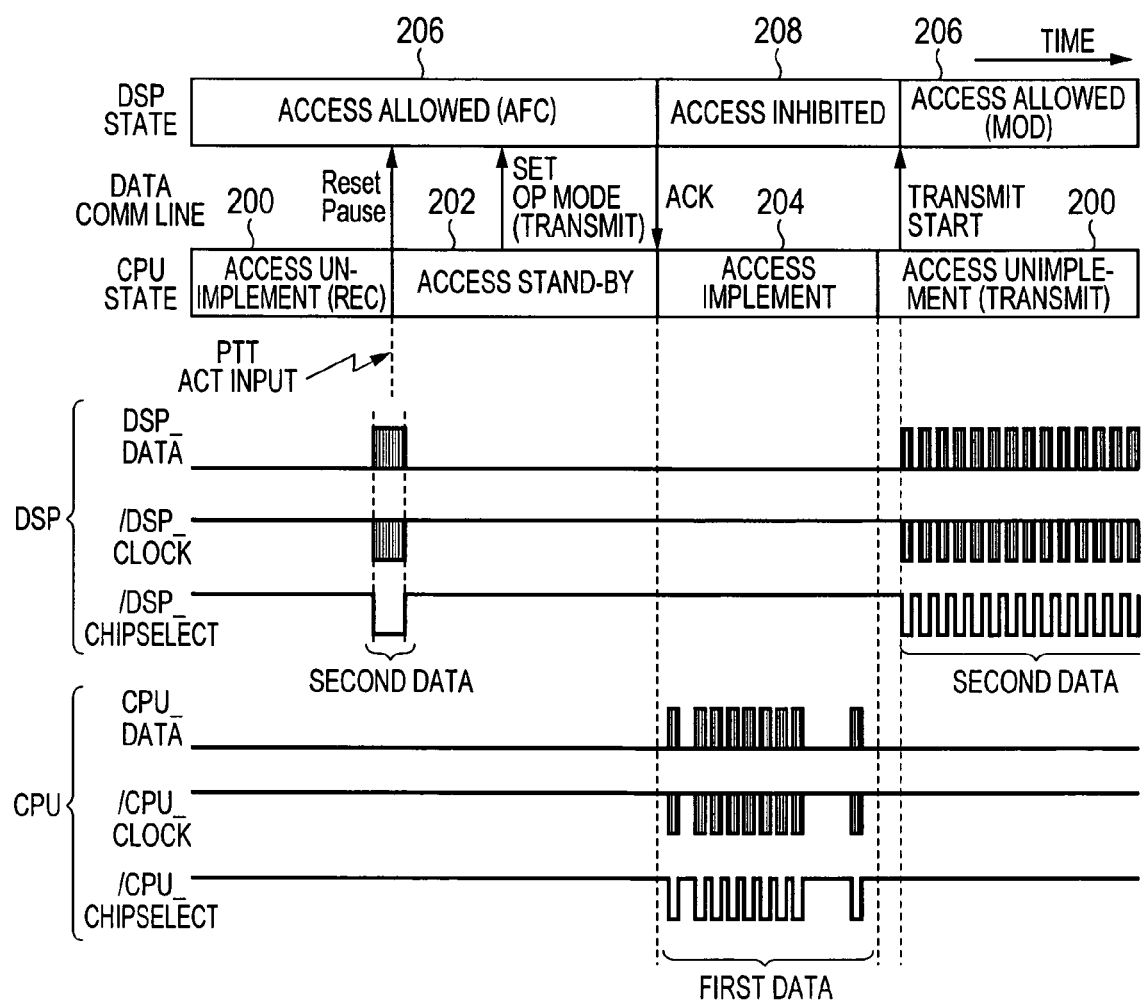
FIG. 6 is a time domain diagram showing a second example of the state transitions of the CPU and the DSP in FIG. 4.

With reference to FIG. 6, in the case where the radio communication device 100 implements signal reception so that the CPU 112 is in the access unimplementing state 200 and the DSP 118 is in the access allowed state 206, when the PTT switch 110 is actuated to change operation of the radio communication device 100 from signal reception to signal transmission and the CPU 112 detects the actuation of the PTT switch 110, the CPU 112 outputs the first signal to the DSP 118 via the data communication line 220. At the same time, the CPU 112 transitions from the access unimplementing state 200 to the access stand-by state 202. The first signal includes a command to reset an offset in AFC and a command to pause AFC. Thereafter, the CPU 112 sets an after-change operation mode (transmission) in the DSP 118 and awaits the second signal from the DSP 118.

Upon the reception of the first signal, the DSP 118 which is in the access allowed state 206 starts safely pausing AFC. When safely pausing AFC is completed, the DSP 118 outputs the second signal inclusive of an acknowledgment signal (ACK) to the CPU 112 via the data communication line 220. At the same time, the DSP 118 transitions from the access allowed state 206 to the access inhibited state 208. Upon the reception of the second signal, the CPU 112 transitions from the access stand-by state 202 to the access implementing state 204. Then, the CPU 112 sets the first data in the PLL IC 128 to control or update the frequency division ratio therein. When the setting of the first data in the PLL IC 128 is completed, the CPU 112 transitions from the access implementing state 204 to the access unimplementing state 200. Then, the CPU 112 outputs the third signal to the DSP 118 via the data communication line 220. The third signal indicates start of signal transmission. Upon the reception of the third signal, the DSP 118 transitions from the access inhibited state 208 to the access allowed state 206 and commences setting the second data in the PLL IC 118 to start modulation for signal transmission.

Figure 7:
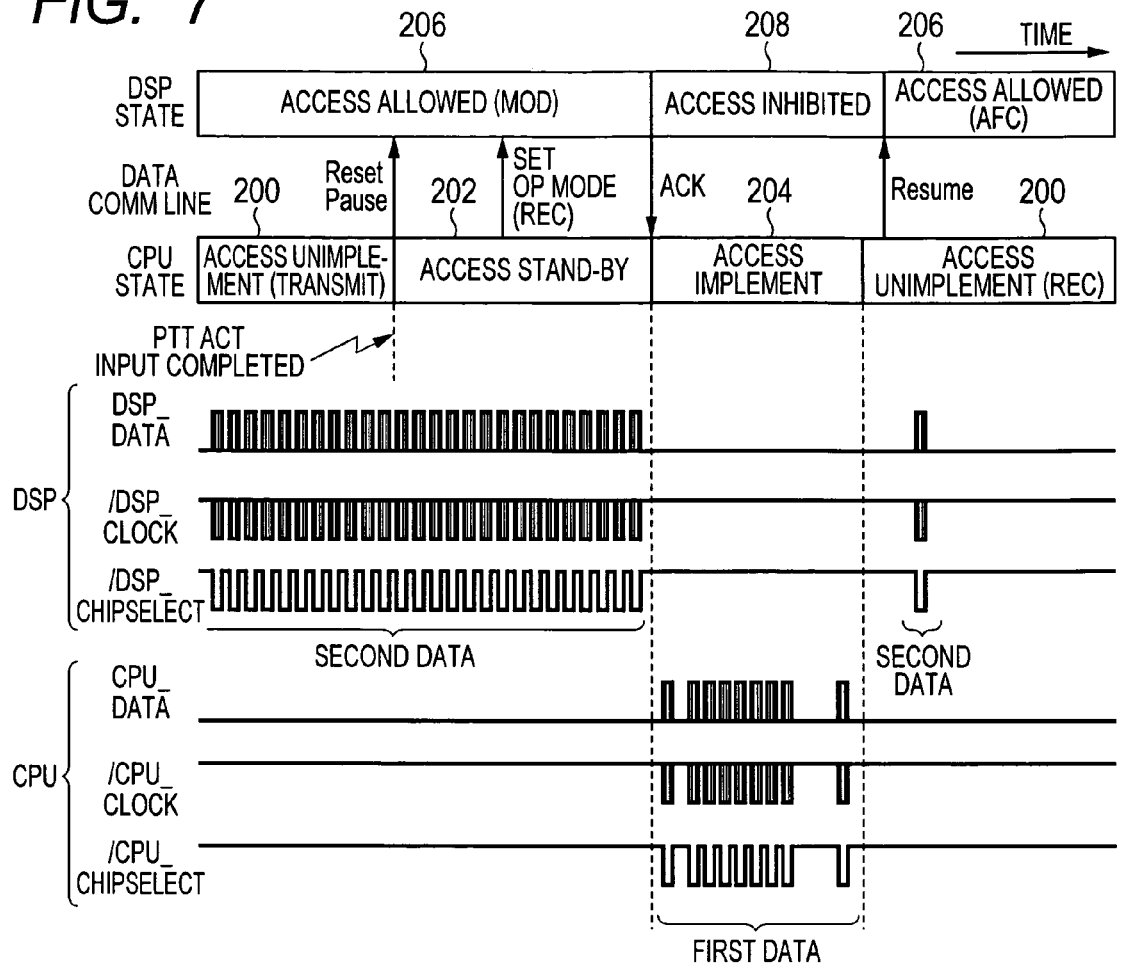
FIG. 7 is a time domain diagram showing a third example of the state transitions of the CPU and the DSP in FIG. 4.

With reference to FIG. 7, in the case where the radio communication device 100 implements signal transmission so that the CPU 112 is in the access unimplementing state 200 and the DSP 118 is in the access allowed state 206, when the PTT switch 110 is actuated to change operation of the radio communication device 100 from signal transmission to signal reception and the CPU 112 detects the actuation of the PTT switch 110, the CPU 112 outputs the first signal to the DSP 118 via the data communication line 220. At the same time, the CPU 112 transitions from the access unimplementing state 200 to the access stand-by state 202. The first signal includes a command to reset an offset in modulation and a command to pause modulation. Thereafter, the CPU 112 sets an after-change operation mode (reception) in the DSP 118 and awaits the second signal from the DSP 118.

Upon the reception of the first signal, the DSP 118 which is in the access allowed state 206 starts safely pausing modulation. When safely pausing modulation is completed, the DSP 118 outputs the second signal inclusive of an acknowledgment signal (ACK) to the CPU 112 via the data communication line 220. At the same time, the DSP 118 transitions from the access allowed state 206 to the access inhibited state 208. Upon the reception of the second signal, the CPU 112 transitions from the access stand-by state 202 to the access implementing state 204. Then, the CPU 112 sets the first data in the PLL IC 128 to control or update the frequency division ratio therein. When the setting of the first data in the PLL IC 128 is completed, the CPU 112 transitions from the access implementing state 204 to the access unimplementing state 200. Then, the CPU 112 outputs the third signal to the DSP 118 via the data communication line 220. The third signal includes a command to resume the access allowed state 206. Upon the reception of the third signal, the DSP 118 transitions from the access inhibited state 208 to the access allowed state 206 and commences setting the second data in the PLL IC 128 to start AFC.

Figure 8:
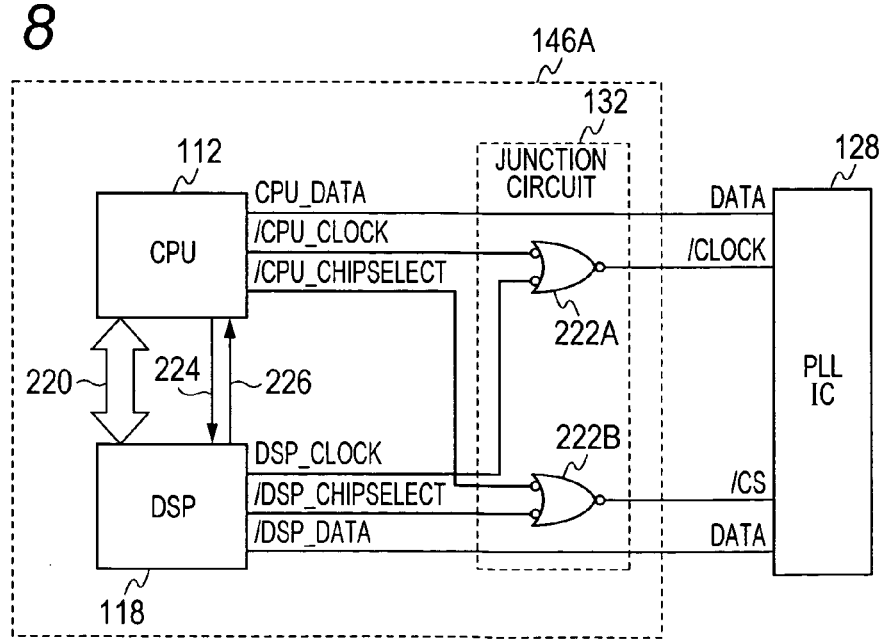
FIG. 8 is a block diagram of another PLL switch circuit.

FIG. 8 shows a PLL switch circuit 146A which may replace the PLL switch circuit 146 (FIG. 4). The PLL switch circuit 146A is similar to the PLL switch circuit 146 except that 1-bit one-way control ports 224 and 226 are provided between the CPU 112 and the DSP 118.

The PLL switch circuit 146A operates as follows. The CPU 112 continuously transfers a first signal HOST_RDY to the DSP 118 via the control port 224. A falling edge in the first signal HOST_RDY indicates the transition of the CPU 112 from the access unimplementing state 200 to the access stand-by state 202 and a desire to transition to the access implementing state 204. A rising edge in the first signal HOST_RDY indicates the transition of the CPU 112 from the access implementing state 204 to the access unimplementing state 200.

The DSP 118 continuously transfers a second signal DSP_ST to the CPU 112 via the control port 226. A falling edge in the second signal DSP_ST indicates the transition of the DSP 118 from the access allowed state 206 to the access inhibited state 208. A rising edge in the second signal DSP_ST indicates the transition of the DSP 118 from the access inhibited state 208 to the access allowed state 206.

When trying access to the PLL IC 128, the CPU 112 changes the first signal HOST_RDY from its high-level state to its low-level state and decides whether or not the second signal DSP_ST changes from its high-level state to its low-level state. Then, the CPU 112 waits until the second signal DSP_ST falls into its low-level state. After detecting the change of the second signal DSP_ST to its low-level state, the CPU 112 accesses the PLL IC 128. While the first signal HOST_RDY is in its high-level state and the DSP 118 holds the second signal DSP_ST in its high-level state, the DSP 118 can access the PLL IC 118 anytime. Only when taking over the access right to the CPU 112, the DSP 118 changes the second signal DSP_ST to its low-level state.

Figure 9:
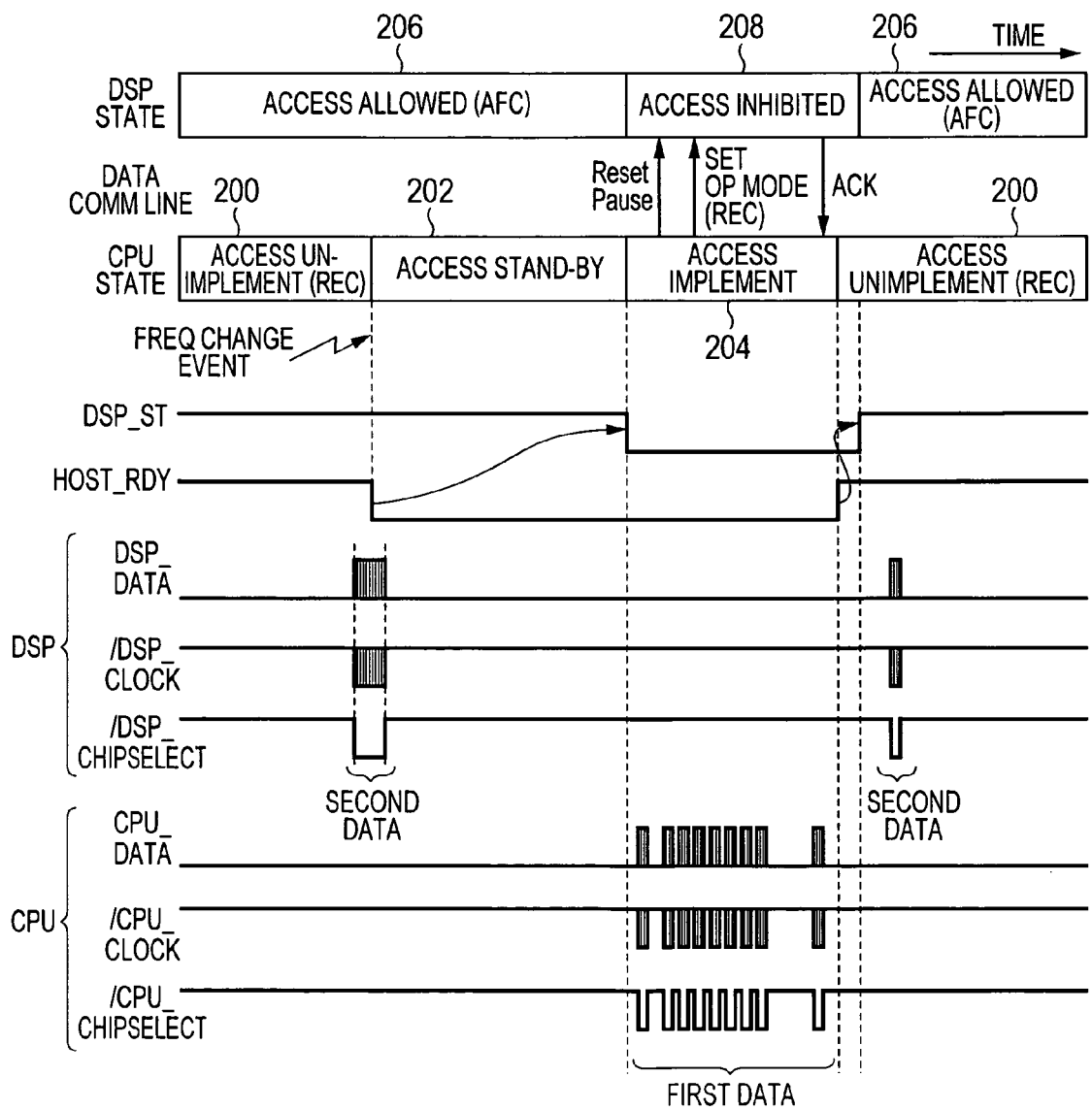
FIG. 9 is a time domain diagram showing a first example of the state transitions of a CPU and a DSP in FIG. 8.

With reference to FIG. 9, in the case where the radio communication device 100 implements signal reception so that the CPU 112 is in the access unimplementing state 200 and the DSP 118 is in the access allowed state 206, when there occurs an event that requests change of the frequency of the output signal from the PLL circuit 144, the CPU 112 changes the first signal HOST_RDY on the control port 224 from its high-level state to its low-level state. At the same time, the CPU 112 transitions from the access unimplementing state 200 to the access stand-by state 202. The DSP 118 continuously monitors the first signal HOST_RDY. When the first signal HOST_RDY falls into its low-level state, the DSP 118 starts safely suspending AFC. Upon the completion of safely suspending AFC, the DSP 118 changes the second signal DSP_ST on the control port 226 from its high-level state to its low-level state. At the same time, the DSP 118 transitions from the access allowed state 206 to the access inhibited state 208.

The CPU 112 continuously monitors the second signal DSP_ST. When the second signal DSP_ST falls into its low-level state, the CPU 112 transitions from the access stand-by state 202 to the access implementing state 204. Then, the CPU 112 sets the first data in the PLL IC 128 to control or update the frequency division ratio therein. At this time, the CPU 112 transfers, to the DSP 118 via the data communication line 220, a command to reset an offset in AFC and a command to pause AFC. In addition, the CPU 112 sets an after-change operation mode (reception) in the DSP 118. Then, the DSP 118 returns an acknowledgment signal (ACK) to the CPU 112 via the data communication line 220. Provided that the acknowledgment signal (ACK) has been received, the CPU 112 transitions from the access implementing state 204 to the access unimplementing state 200 when the setting of the first data in the PLL IC 128 is completed. At the same time, the CPU 112 returns the first signal HOST_RDY on the control port 224 to its high-level state. The DSP 118 changes from the access inhibited state 208 to the access allowed state 206 in response to the change of the first signal HOST_RDY to its high-level state. At the same time, the DSP 118 returns the second signal DSP_ST to its high-level state and recommences setting the second data in the PLL IC 128 to restart AFC.

Figure 10:
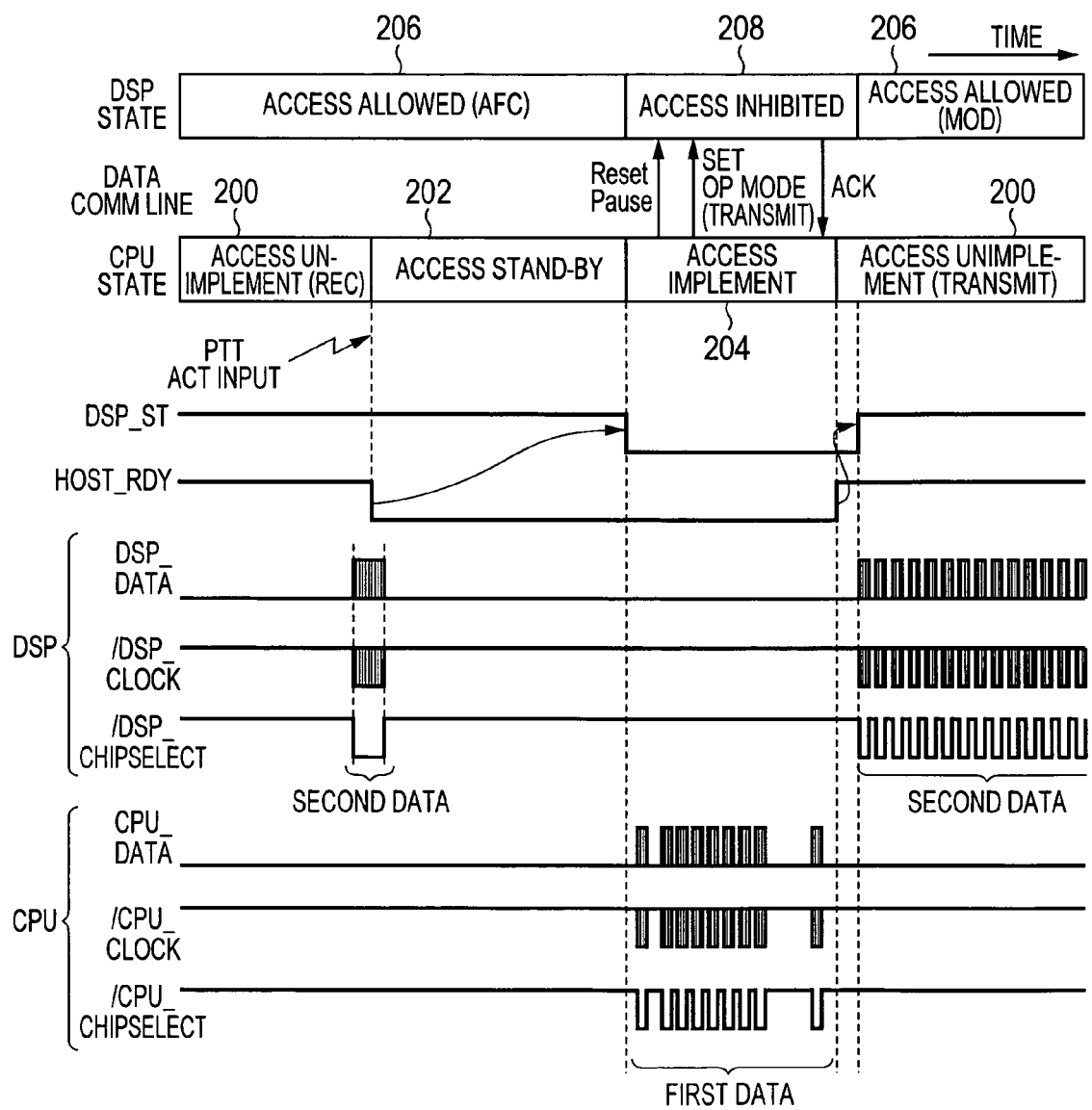
FIG. 10 is a time domain diagram showing a second example of the state transitions of the CPU and the DSP in FIG. 8.

With reference to FIG. 10, in the case where the radio communication device 100 implements signal reception so that the CPU 112 is in the access unimplementing state 200 and the DSP 118 is in the access allowed state 206, when the PTT switch 110 is actuated to change operation of the radio communication device 100 from signal reception to signal transmission and the CPU 112 detects the actuation of the PTT switch 110, the CPU 112 changes the first signal HOST_RDY on the control port 224 from its high-level state to its low-level state. At the same time, the CPU 112 transitions from the access unimplementing state 200 to the access stand-by state 202. The DSP 118 continuously monitors the first signal HOST_RDY. When the first signal HOST_RDY falls into its low-level state, the DSP 118 starts safely suspending AFC. Upon the completion of safely suspending AFC, the DSP 118 changes the second signal DSP_ST on the control port 226 from its high-level state to its low-level state. At the same time, the DSP 118 transitions from the access allowed state 206 to the access inhibited state 208.

The CPU 112 continuously monitors the second signal DSP_ST. When the second signal DSP_ST falls into its low-level state, the CPU 112 transitions from the access stand-by state 202 to the access implementing state 204. Then, the CPU 112 sets the first data in the PLL IC 128 to control or update the frequency division ratio therein. At this time, the CPU 112 transfers, to the DSP 118 via the data communication line 220, a command to reset an offset in AFC and a command to pause AFC. In addition, the CPU 112 sets an after-change operation mode (transmission) in the DSP 118. Then, the DSP 118 returns an acknowledgment signal (ACK) to the CPU 112 via the data communication line 220. Provided that the acknowledgment signal (ACK) has been received, the CPU 112 transitions from the access implementing state 204 to the access unimplementing state 200 when the setting of the first data in the PLL IC 128 is completed. At the same time, the CPU 112 returns the first signal HOST_RDY on the control port 224 to its high-level state. The DSP 118 changes from the access inhibited state 208 to the access allowed state 206 in response to the change of the first signal HOST_RDY to its high-level state. At the same time, the DSP 118 returns the second signal DSP_ST to its high-level state and commences setting the second data in the PLL IC 128 to start modulation for signal transmission.

Figure 11:
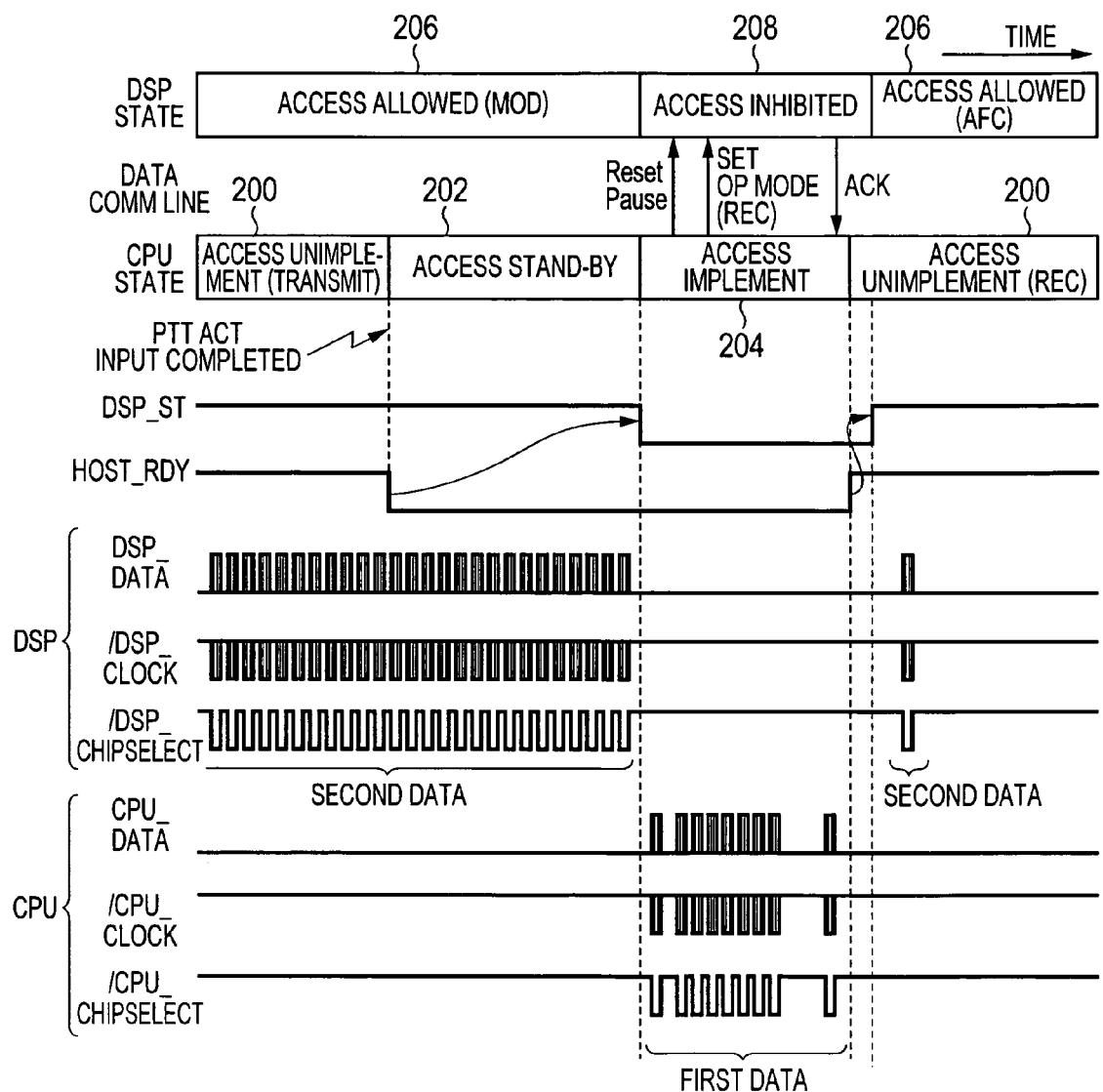
FIG. 11 is a time domain diagram showing a third example of the state transitions of the CPU and the DSP in FIG. 8.

With reference to FIG. 11, in the case where the radio communication device 100 implements signal transmission so that the CPU 112 is in the access unimplementing state 200 and the DSP 118 is in the access allowed state 206, when the PTT switch 110 is actuated to change operation of the radio communication device 100 from signal transmission to signal reception and the CPU 112 detects the actuation of the PTT switch 110, the CPU 112 changes the first signal HOST_RDY on the control port 224 from its high-level state to its low-level state. At the same time, the CPU 112 transitions from the access unimplementing state 200 to the access stand-by state 202. The DSP 118 continuously monitors the first signal HOST_RDY. When the first signal HOST_RDY falls into its low-level state, the DSP 118 starts safely suspending modulation. Upon the completion of safely suspending modulation, the DSP 118 changes the second signal DSP_ST on the control port 226 from its high-level state to its low-level state. At the same time, the DSP 118 transitions from the access allowed state 206 to the access inhibited state 208.

The CPU 112 continuously monitors the second signal DSP_ST. When the second signal DSP_ST falls into its low-level state, the CPU 112 transitions from the access stand-by state 202 to the access implementing state 204. Then, the CPU 112 sets the first data in the PLL IC 128 to control or update the frequency division ratio therein. At this time, the CPU 112 transfers, to the DSP 118 via the data communication line 220, a command to reset an offset in modulation and a command to pause modulation. In addition, the CPU 112 sets an after-change operation mode (reception) in the DSP 118. Then, the DSP 118 returns an acknowledgment signal (ACK) to the CPU 112 via the data communication line 220. Provided that the acknowledgment signal (ACK) has been received, the CPU 112 transitions from the access implementing state 204 to the access unimplementing state 200 when the setting of the first data in the PLL IC 128 is completed. At the same time, the CPU 112 returns the first signal HOST_RDY on the control port 224 to its high-level state. The DSP 118 changes from the access inhibited state 208 to the access allowed state 206 in response to the change of the first signal HOST_RDY to its high-level state. At the same time, the DSP 118 returns the second signal DSP_ST to its high-level state and commences setting the second data in the PLL IC 128 to start AFC.

Since the first signal HOST_RDY has one bit only, it is sufficient for the DSP 118 to decide whether the first signal HOST_RDY is in its high-level state or its low-level state. Thus, it is unnecessary for the DSP 118 to decode the first signal HOST_RDY in a complicated way. Since the second signal DSP_ST has one bit only, it is sufficient for the CPU 112 to decide whether the second signal DSP_ST is in its high-level state or its low-level state. Thus, it is unnecessary for the CPU 112 to decode the second signal DSP_ST in a complicated way. Each of the decisions about the states of the first signal HOST_RDY and the second signal DSP_ST takes only a short time. Therefore, the mediation can be smoothly performed between the CPU 112 and the DSP 118 regarding the right of access to the PLL IC 128.

It should be noted that one of the control ports 224 and 226 may be omitted. The two control ports 224 and 226 may be replaced by three or more control ports.

According to a modification of the PLL switch circuit 146A, the control port 226 is omitted so that there is only the control port 224 between the CPU 112 and the DSP 118. The modification of the PLL switch circuit 146A operates as follows.

Figure 12:
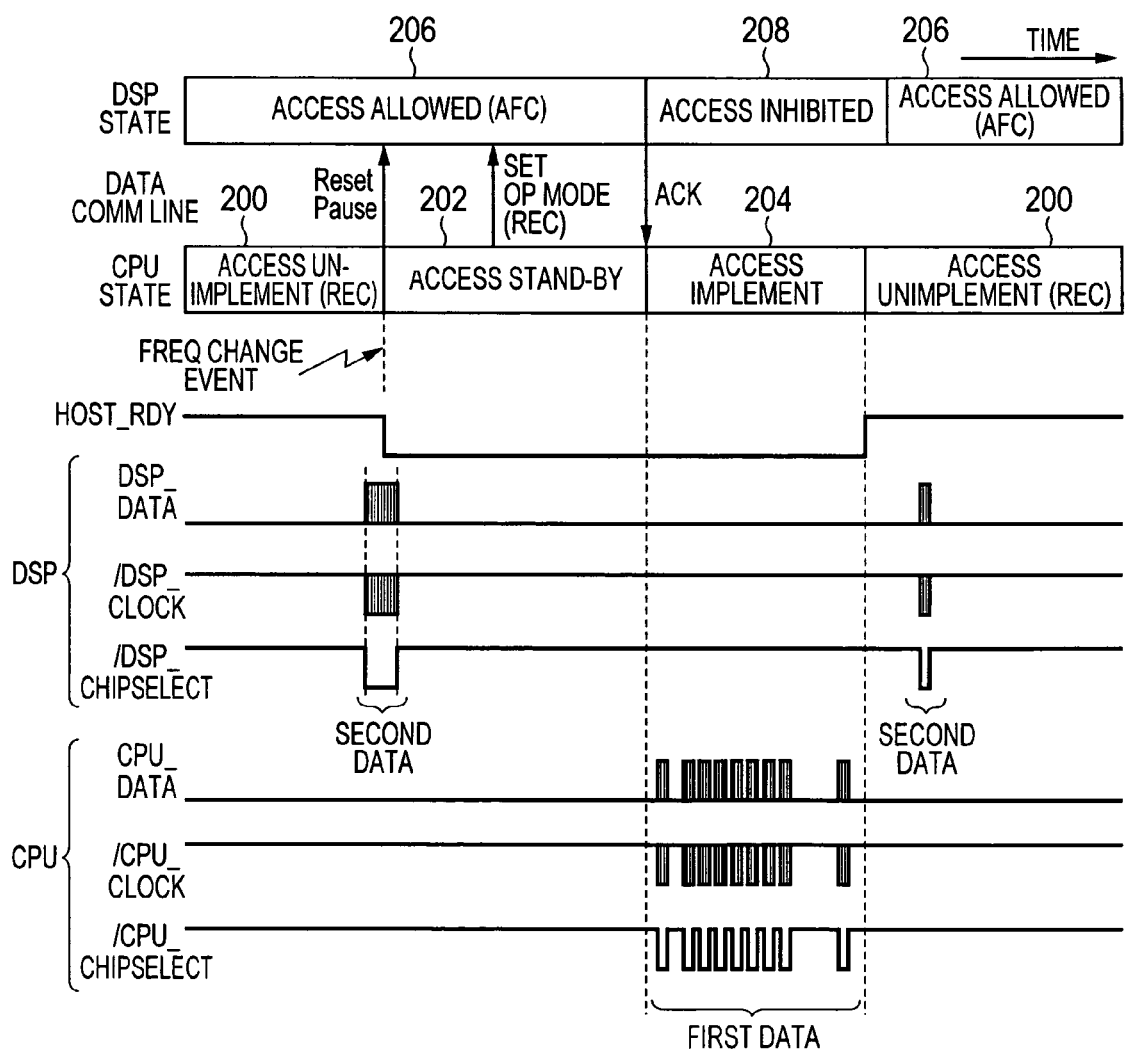
FIG. 12 is a time domain diagram showing an example of the state transitions of a CPU and a DSP in a modified PLL switch circuit.

With reference to FIG. 12, in the case where the radio communication device 100 implements signal reception so that the CPU 112 is in the access unimplementing state 200 and the DSP 118 is in the access allowed state 206, when there occurs an event that requests change of the frequency of the output signal from the PLL circuit 144, the CPU 112 changes the first signal HOST_RDY on the control port 224 from its high-level state to its low-level state. At the same time, the CPU 112 transitions from the access unimplementing state 200 to the access stand-by state 202. In addition, the CPU 112 transfers, to the DSP 118 via the data communication line 220, a command to reset an offset in AFC and a command to pause AFC. Subsequently, the CPU 112 sets an after-change operation mode (reception) in the DSP 118 and then awaits a second signal, that is, an acknowledgment signal (ACK) from the DSP 118. When the DSP 118 is accessing the PLL IC 128 at the time of the change of the first signal HOST_RDY to its low-level state, the CPU 112 transitions from the access unimplementing state 200 to the access stand-by state 202 and does not output the first data to the PLL IC 128. Thus, the first data and the second data are prevented from colliding with each other in the PLL IC 128.

The DSP 118 continuously monitors the first signal HOST_RDY. When the first signal HOST_RDY falls into its low-level state, the DSP 118 starts safely pausing AFC. When safely pausing AFC is completed, the DSP 118 outputs a second signal (an acknowledgment signal (ACK)) to the CPU 112 via the data communication line 220. At the same time, the DSP 118 transitions from the access allowed state 206 to the access inhibited state 208. Upon the reception of the second signal, the CPU 112 transitions from the access stand-by state 202 to the access implementing state 204. Then, the CPU 112 sets the first data in the PLL IC 128 to control or update the frequency division ratio therein. When the setting of the first data in the PLL IC 128 is completed, the CPU 112 transitions from the access implementing state 204 to the access unimplementing state 200. At the same time, the CPU 112 returns the first signal HOST_RDY on the control port 224 to its high-level state. In response to the return of the first signal HOST_RDY to its high-level state, the DSP 118 transitions from the access inhibited state 208 to the access allowed state 206 and recommences setting the second data in the PLL IC 128 to restart AFC.

Channel selection by the radio communication device 100 includes priority scan designed as follows. The demodulation of a received signal in a currently selected channel is regularly interrupted. For every interruption, the tune in the currently selected channel is replaced by the tune in a specified channel different from the currently selected channel, and a check is made as to whether or not a desired signal is present in the specified channel. When the result of the check indicates that the desired signal is not present in the specified channel, the tune in the currently selected channel is restored and the demodulation of the received signal in the currently selected channel is restarted and maintained. On the other hand, when the result of the check indicates that the desired signal is present in the specified channel, the tune in the specified channel is continued and the demodulation of the desired signal is started instead of the demodulation of the received signal in the currently selected channel.

Generally, the demodulation of a digital signal requires good frequency tracking performances of a radio communication device. During priority scan, it is preferable to efficiently implement frequency tracking at the time of changing the tune between the currently selected channel and the specified channel. Accordingly, during priority scan, the CPU 112 does not command the DSP 118 to reset the frequency division ratio in the PLL IC 128 (reset an offset in AFC) when requiring the DSP 118 to turn over the access right. The CPU 112 restricts restart of AFC implemented via the DSP 118. During priority scan, the CPU 112 and the DSP 118 in the PLL switch circuit 146 of FIG. 4 operate as follows.

Figure 13:
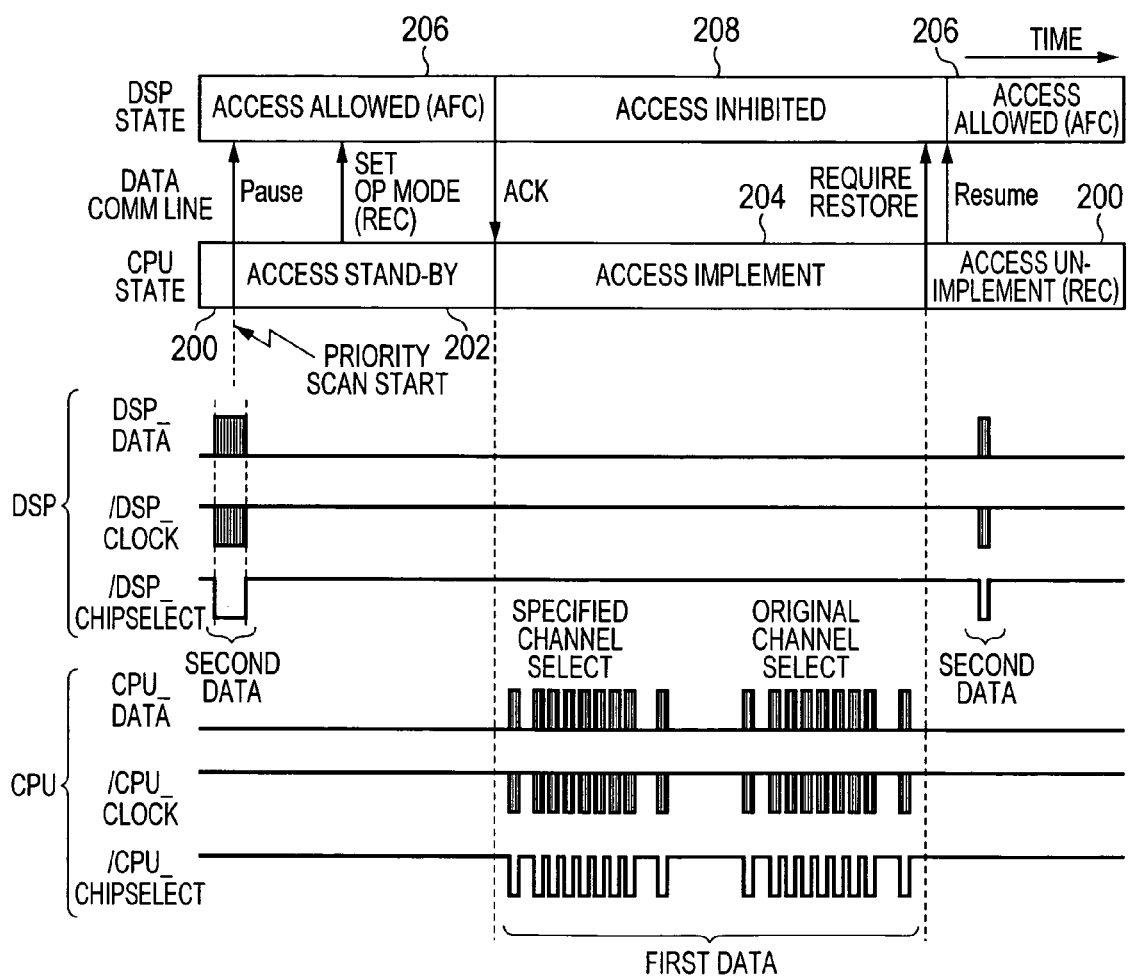
FIG. 13 is a time domain diagram showing an example of the state transitions of the CPU and the DSP in FIG. 4 which occur regarding priority scan.

With reference to FIG. 13, in the case where the radio communication device 100 implements signal reception so that the CPU 112 is in the access unimplementing state 200 and the DSP 118 is in the access allowed state 206, when there occurs an event (a priority scan start) that requests change of the frequency of the output signal from the PLL circuit 144, the CPU 112 outputs the first signal to the DSP 118 via the data communication line 220. At the same time, the CPU 112 transitions from the access unimplementing state 200 to the access stand-by state 202. The first signal includes a command to pause AFC only. The first signal does not include a command to reset an offset in AFC. Thereafter, the CPU 112 sets an after-change operation mode (reception) and awaits the second signal from the DSP 118. When the DSP 118 is accessing the PLL IC 128 at the time of the transfer of the first signal from the CPU 112 to the DSP 118, the CPU 112 transitions from the access unimplementing state 200 to the access stand-by state 202 and does not output the first data to the PLL IC 128. Thus, the first data and the second data are prevented from colliding with each other in the PLL IC 128.

Upon the reception of the first signal, the DSP 118 starts safely pausing AFC. When safely pausing AFC is completed, the DSP 118 outputs the second signal inclusive of an acknowledgment signal (ACK) to the CPU 112 via the data communication line 220. At the same time, the DSP 118 transitions from the access allowed state 206 to the access inhibited state 208. Upon the reception of the second signal, the CPU 112 transitions from the access stand-by state 202 to the access implementing state 204. Then, the CPU 112 sets the first data in the PLL IC 128 for selecting the specified channel instead of the currently selected channel (the original channel). When the setting of the first data in the PLL IC 128 is completed, the CPU 112 checks whether or not a desired signal is present in the specified channel in a conventional way. For example, to implement this check, the CPU 112 decides whether or not there are conditions of opening the squelch. When the result of the check indicates that a desired signal is not present in the specified channel, the CPU 112 sets the first data in the PLL IC 128 for selecting the original channel again. When the setting of the first data in the PLL IC 128 is completed, the CPU 112 transitions from the access implementing state 204 to the access unimplementing state 200. At substantially the same time, the CPU 112 outputs the third signal to the DSP 118 via the data communication line 220. The third signal includes a command to restore AFC and a command to resume the access allowed state 206. Upon the reception of the third signal, the DSP 118 transitions from the access inhibited state 208 to the access allowed state 206 and recommences setting the second data in the PLL IC 128 to restart AFC. When loopback from the specified channel to the original channel occurs in this way, resetting AFC is not implemented so that an offset in AFC for the original channel, which occurs immediately before the selected channel change, is maintained. Therefore, AFC can equalize the frequency of the output signal from the PLL circuit 144 to a target frequency in a short time.

The CPU 112 saves the frequency offset with respect to the PLL IC 128 which occurs immediately before the currently selected channel is replaced by the specified channel. The CPU 112 sets the frequency offset to "0" with respect to the PLL IC 128 when setting the first data in the PLL IC 128 for selecting the specified channel. This design is made for the following reason. The frequency offset in the PLL IC 128 is not reset. It is desirable that conditions of the squelch are decided independently of the frequency offset regarding frequency tracking for the specified channel. When the specified channel is replaced by the original channel, the CPU 112 uses the saved frequency offset for frequency tracking. Thus, priority scan can be efficiently performed.

The preferred embodiment of this invention has been described above with reference to the accompanying drawings. This invention should not be limited by the described preferred embodiment. Various modifications and changes may be made in this invention within the sprit and scope of the appended claims. These modifications and changes should be construed as being embraced in this invention.

What is claimed is:

1. A radio communication device comprising:
   a signal generator outputting a signal whose frequency is uniquely decided by frequency data set therein;

a control section outputting first data to the signal generator and setting the first data therein as frequency data, the control section being able to transition among an access unimplementing state where the control section does not access the signal generator, an access stand-by state where the control section waits for access to the signal generator, and an access implementing state where the control section accesses the signal generator; and a signal processing section outputting second data to the signal generator and setting the second data therein as frequency data for increasing or decreasing the frequency of the signal outputted by the signal generator, the signal processing section being able to transition between an access allowed state where the signal processing section is allowed to access the signal generator and an access inhibited state where the signal processing section is inhibited from accessing the signal generator;

wherein the signal generator comprises a PLL circuit whose control object is a voltage controlled oscillator;

wherein the first data and the second data are subjected to OR operation by a logical adder to form setting data of a frequency division ratio in a frequency divider in the PLL circuit, and each of the first data and the second data comprises at least one of a data signal, an address signal, a control signal, and a clock signal;

wherein during a transmission mode of operation of the radio communication device, the second data is data for increasing or decreasing the frequency of the signal outputted by the signal generator to implement modulation via the signal processing section;

wherein during a reception mode of operation of the radio communication device, the second data is data for increasing or decreasing the frequency of the signal outputted by the signal generator to implement automatic frequency control via the signal processing section;

wherein the control section transfers, to the signal processing section, a first signal indicative of a desire to transition to the access implementing state to start outputting the first data to the frequency divider and indicative of transition of the control section from the access implementing state to end outputting the first data to the frequency divider; and wherein the signal processing section transfers, to the control section, a second signal controlling the outputting of the first data from the control section to the frequency divider and being indicative of transition of the signal processing section between the access allowed state and the access inhibited state.

2. A radio communication device as recited in claim 1, wherein the first signal and the second signal transferred between the control section and the signal processing section travel along a data communication line or a control port.

3. A radio communication device as recited in claim 1, wherein when the control section transfers, to the signal processing section, the first signal indicative of the desire to transition to the access implementing state, the control section commands the signal processing section to reset a frequency division ratio in the signal generator and restricts the automatic frequency control implemented via the signal processing section.

* * * * *